United States Patent
Zhang et al.

(10) Patent No.: US 10,594,586 B2
(45) Date of Patent: Mar. 17, 2020

(54) DIALING TEST METHOD, DIALING TEST SYSTEM, AND COMPUTING NODE

(71) Applicant: Huawei Technologies Co., Ltd., Shenzhen (CN)

(72) Inventors: Zhengxian Zhang, Beijing (CN); Yingjun Tian, Hangzhou (CN); Yu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 15/799,297

(22) Filed: Oct. 31, 2017

(65) Prior Publication Data
US 2018/0069778 A1    Mar. 8, 2018

Related U.S. Application Data

(63) Continuation of application No. PCT/CT2016/096703, filed on Aug. 25, 2016.

(51) Int. Cl.
*G06F 15/173*    (2006.01)
*H04L 12/26*    (2006.01)
(Continued)

(52) U.S. Cl.
CPC ............ *H04L 43/50* (2013.01); *H04L 49/253* (2013.01); *H04L 61/20* (2013.01);
(Continued)

(58) Field of Classification Search
CPC ... H04L 41/0893; H04L 43/50; H04L 49/253; H04L 61/20; H04L 61/2007
(Continued)

(56) References Cited

U.S. PATENT DOCUMENTS

2004/0003070 A1*  1/2004  Fernald .................. H04L 43/50
                                                       709/223
2005/0286685 A1   12/2005  Vukovljak et al.
(Continued)

FOREIGN PATENT DOCUMENTS

CN    1856150 A    11/2006
CN    102780758 A   11/2012
(Continued)

OTHER PUBLICATIONS

Machine Translation and Abstract of Chinese Publication No. CN1856150, Nov. 1, 2006, 9 pages.
(Continued)

*Primary Examiner* — Bharat Barot
(74) *Attorney, Agent, or Firm* — Conley Rose, P.C.

(57) ABSTRACT

A dialing test method, a dialing test system, and a computing node relate to the network field. In this method, a dialing test system respectively creates a two dialing test ports on two computing nodes, where both Internet Protocol (IP) addresses of the two dialing test ports are IP addresses of a dialing test network, and the dialing test network does not overlap a service network of a virtual machine (VM). The dialing test system separately deploys respective dialing test resources for the two dialing test ports, and the dialing test resources does not overlap a resource of the VM on the two computing nodes, and the dialing test system triggers a dialing test procedure such that a dialing test task is executed between the two dialing test ports using the dialing test resources.

20 Claims, 4 Drawing Sheets

(51) Int. Cl.
  *H04L 12/937* (2013.01)
  *H04L 29/12* (2006.01)
  *H04L 12/24* (2006.01)
  *H04L 12/931* (2013.01)

(52) U.S. Cl.
  CPC .......... *H04L 41/0893* (2013.01); *H04L 49/70* (2013.01); *H04L 61/2007* (2013.01); *H04L 61/6068* (2013.01)

(58) Field of Classification Search
  USPC .............. 709/202–203, 223–224, 227–228
  See application file for complete search history.

(56) References Cited

U.S. PATENT DOCUMENTS

| | | | |
|---|---|---|---|
| 2007/0106807 A1* | 5/2007 | Hegde .................... | H04L 43/50 709/230 |
| 2012/0290695 A1 | 11/2012 | Barabash et al. | |
| 2013/0097304 A1 | 4/2013 | Asthana et al. | |
| 2013/0283265 A1* | 10/2013 | Acharya ............ | G06F 9/45558 718/1 |
| 2014/0160961 A1 | 6/2014 | Dragulescu et al. | |
| 2015/0026667 A1 | 1/2015 | Pruss et al. | |
| 2016/0028598 A1* | 1/2016 | Khakpour .............. | H04L 43/50 709/224 |
| 2016/0373345 A1 | 12/2016 | Li et al. | |

FOREIGN PATENT DOCUMENTS

| | | |
|---|---|---|
| CN | 104246744 A | 12/2014 |
| CN | 104394080 A | 3/2015 |
| CN | 104954281 A | 9/2015 |
| CN | 105634804 A | 6/2016 |

OTHER PUBLICATIONS

Machine Translation and Abstract of Chinese Publication No. CN104394080, Mar. 4, 2015, 11 pages.
Machine Translation and Abstract of Chinese Publication No. CN105634804, Jun. 1, 2016, 18 pages.
Foreign Communication From A Counterpart Application, PCT/CN2016/096703, International Search Report dated Apr. 26, 2017, 7 pages.
Foreign Communication From A Counterpart Application, PCT/CN2016/096703, Written Opinion dated Apr. 26, 2017, 4 pages.
Foreign Communication From A Counterpart Application, European Application No. 16892930.5, Extended European Search Report dated Aug. 13, 2018, 7 pages.
Machine Translation and Abstract of Chinese Publication No. CN104246744, Dec. 24, 2014, 12 pages.
Foreign Communication From A Counterpart Application, Chinese Application No. 201680003737.6, Chinese Office Action dated Aug. 5, 2019, 7 pages.

* cited by examiner

DIALING TEST METHOD, DIALING TEST SYSTEM, AND COMPUTING NODE

CROSS-REFERENCE TO RELATED APPLICATION

This application is a continuation of International Patent Application No. PCT/CN2016/096703 filed on Aug. 25, 2016, which is hereby incorporated by reference in its entirety.

TECHNICAL FIELD

Embodiments of the present application relate to the network field, and in particular, to a dialing test method, a dialing test system, and a computing node.

BACKGROUND

Cloud computing is performed on multiple computing nodes using a virtualization technology, and a virtual machine (VM) that provides a service is deployed on each computing node.

A virtual switch is deployed on a computing node. In a virtual network for cloud computing, virtual switches on different computing nodes are interconnected using the network, and a data packet can be forwarded between the virtual switches. A VM on the computing node accesses a service network using the virtual switch. The service network belongs to the virtual network. VMs on the different computing nodes interact data packets with each other in the service network.

In other approaches, connectivity or network performance between two computing nodes is detected by performing a dialing test using VMs on the two computing nodes and using a service network. Specific implementation of the dialing test is as follows. A VM on a computing node is manually operated to send a data packet used for a dialing test to a virtual switch on the computing node, the virtual switch on the computing node forwards the data packet to a virtual switch on another computing node in the service network, and then, the virtual switch on the other computing node forwards the data packet to a VM on the other computing node. It can be learned that, in the other approaches, a dialing test is implemented in a service network using a VM, and a service is affected because a service resource of the VM is occupied by the dialing test.

SUMMARY

In view of this, this application provides a dialing test method, a dialing test system, and a computing node such that a service resource of a VM is not used for implementing a dialing test.

According to a first aspect, this application provides a dialing test method used for performing a dialing test on a VM system.

The VM system includes at least two computing nodes, and the at least two computing nodes are configured to deploy a VM. In a possible scenario, a VM is deployed on one or more computing nodes of the at least two computing nodes when a single dialing test is performed using the dialing test method.

A cloud computing platform is used as a management center of the VM system, and is deployed on at least one computing node. A dialing test system is deployed on the cloud computing platform, and the dialing test method is performed by the dialing test system.

In the dialing test method, the dialing test system creates a dialing test network that does not overlap a service network. A manner for implementing non-overlapping between the dialing test network and the service network is that an Internet Protocol (IP) address segment of the dialing test network is different from an IP address segment of the service network. In this embodiment of the present application, a dialing test is performed in the dialing test network. The service network does not overlap the dialing test network such that a data packet used for a dialing test is not forwarded using the service network, that is, network bandwidth of the service network is not occupied, and therefore, a service is not affected. In addition, a data packet interacted between VMs in the service network is not forwarded using the dialing test network such that dialing test result distortion is not caused because the dialing test is not affected.

In the dialing test method, the dialing test system obtains a dialing test policy. A source computing node and a destination computing node on which a dialing test is to be performed are designated in the dialing test policy. In a possible design, an identifier used to identify the source computing node and an identifier used to identify the destination computing node are recorded in the dialing test policy.

In the dialing test method, the dialing test system creates the source dialing test port on the source computing node, and creates the destination dialing test port on the destination computing node. An IP address of the source dialing test port and an IP address of the destination dialing test port are separately different IP addresses of the dialing test network such that a dialing test is performed by sending a data packet between the source dialing test port and the destination dialing test port using the IP addresses.

In the dialing test method, the dialing test system obtains a dialing test resource of the source dialing test port from the source computing node by means of division, and obtains a dialing test resource of the destination dialing test port from the destination computing node by means of division. In a possible design, the dialing test system directly obtains the dialing test resource of the source dialing test port from the source computing node by means of division, and directly obtains the dialing test resource of the destination dialing test port from the destination computing node by means of division. In another possible design, the dialing test system instructs another function module on the cloud computing platform to obtain the dialing test resource of the source dialing test port from the source computing node by means of division, and obtain the dialing test resource of the destination dialing test port from the destination computing node by means of division. In still another possible design, the dialing test system instructs the source computing node to obtain the dialing test resource of the source dialing test port from a resource of the source computing node by means of division, and instructs the destination computing node to obtain the dialing test resource of the destination dialing test port from a resource of the destination computing node by means of division.

The dialing test resource of the source dialing test port does not overlap a resource of a VM deployed on the source computing node, and the dialing test resource of the destination dialing test port does not overlap a resource of a VM deployed on the destination computing node. A dialing test resource of a dialing test port does not overlap a resource used for deploying a VM. When a dialing test from the source dialing test port to the destination dialing test port is performed, only the dialing test resource is used, and the resource used for deploying a VM is not occupied in order to avoid a case in which a service is affected because the resource used for deploying a VM is occupied by the dialing test.

In the dialing test method, the dialing test system triggers a dialing test procedure, including delivering a dialing test task to the source computing node and the destination computing node. The dialing test task may be a connectivity dialing test or a network performance dialing test. The dialing test system executes, in the dialing test network, a dialing test task from the source dialing test port to the destination dialing test port using the dialing test resource of the source dialing test port and the dialing test resource of the destination dialing test port. The dialing test task is executed from the source dialing test port to the destination dialing test port such that connectivity or network performance from the source computing node to the destination computing node is detected.

In comparison with the other approaches, in the dialing test method provided in this application, a dialing test may be implemented in a dialing test network directly using a dialing test port in order to avoid a case in which a service is affected because a service network is occupied. When a dialing test from a source computing node to a destination computing node is implemented, a resource that is on a computing node and that does not belong to a VM is directly used in order to avoid a case in which a service running on the VM is affected because a resource of the VM is occupied. In addition, a data packet used for a dialing test is sent from a source dialing test port directly using a dialing test resource of the source dialing test port (for example, the data packet is sent using a running process of the dialing test resource of the source dialing test port), and the data packet may be received from a destination dialing test port directly using a dialing test resource of the destination dialing test port (for example, the data packet is received using a running process of the dialing test resource of the destination dialing test port). An entire dialing test process from the source dialing test port to the destination dialing test port does not need participation of an operating system (OS) of the VM. Therefore, a resource required for running the OS of the VM is saved.

In a possible design, an implementation manner for configuring the dialing test resource for the source dialing test port includes allocating a first namespace to the source dialing test port. The first namespace includes a resource required by the source dialing test port for performing a dialing test, that is, the first namespace includes the dialing test resource of the source dialing test port. The resource of the VM deployed on the source computing node does not belong to the first namespace but belongs to another namespace. In this design, resources are isolated using namespaces such that the dialing test resource of the source dialing test port does not overlap the resource of the deployed VM.

In a possible design, the first namespace is isolated from the VM deployed on the source computing node. By means of isolation, when a dialing test is performed on the source dialing test port using the dialing test resource of the first namespace, the resource of the VM cannot be used in order to avoid a case in which a service is affected because a resource used for deploying the VM is occupied by the dialing test. By means of isolation, the VM cannot use the resource of the first namespace either in order to avoid a case in which dialing test result distortion is caused because the dialing test is affected.

In a possible design, occupancy of the dialing test resource included in the first namespace is less than resource occupancy of each VM deployed on the source computing node. In this design, during implementation of a dialing test, a data packet used for a dialing test is sent from the source dialing test port directly using the dialing test resource of the source dialing test port, for example, the data packet is sent using a running process of the dialing test resource of the source dialing test port. Therefore, a resource required for running an OS of the VM in the other approaches is saved. In the other approaches, a dialing test is performed using a VM. By contrast, in this design, a dialing test is performed using the dialing test resource included in the first namespace, and few resources are occupied by the dialing test such that implementation of a dialing test on the source computing node is facilitated. The source computing node has limited resources, and therefore, even though remaining resources of the source computing node are not enough to deploy a VM, enough dialing test resources can be usually obtained from the remaining resources of the source computing node by means of division such that a success rate of the dialing test on the source computing node is increased.

In a possible design, an implementation manner for configuring the dialing test resource for the destination dialing test port includes allocating a second namespace to the destination dialing test port. The second namespace includes a resource required by the destination dialing test port for performing a dialing test, that is, the second namespace includes the dialing test resource of the destination dialing test port. The resource of the VM deployed on the destination computing node does not belong to the second namespace but belongs to another namespace. In this design, resources are isolated using namespaces such that the dialing test resource of the destination dialing test port does not overlap the resource of the deployed VM.

In a possible design, the second namespace is isolated from the VM deployed on the destination computing node. By means of isolation, when a dialing test is performed on the destination dialing test port using the dialing test resource of the second namespace, the resource of the VM cannot be used in order to avoid a case in which a service is affected because a resource used for deploying the VM is occupied by the dialing test. By means of isolation, the VM cannot use the resource of the second namespace either in order to avoid a case in which dialing test result distortion is caused because the dialing test is affected.

In a possible design, occupancy of the dialing test resource included in the second namespace is less than resource occupancy of each VM deployed on the destination computing node. In the other approaches, a dialing test is implemented using a VM. By contrast, in this design, during implementation of a dialing test, a data packet is received from the destination dialing test port directly using the dialing test resource of the destination dialing test port, for example, the data packet is received using a running process of the dialing test resource of the destination dialing test port. Therefore, a resource required for running an OS of the VM is saved. In the other approaches, a dialing test is performed using a VM. By contrast, in this design, a dialing test is performed using the dialing test resource included in the second namespace, and few resources are occupied in the dialing test such that implementation of a dialing test on the destination computing node is facilitated. The destination computing node has limited resources, and therefore, even though remaining resources of the destination computing node are not enough to deploy a VM, enough dialing test resources can be usually obtained from the remaining resources of the destination computing node by means of division such that a success rate of the dialing test on the destination computing node is increased.

In a possible design, the dialing test system creates the dialing test network, and creates at least two dialing test subnets in the dialing test network. An IP address segment of each dialing test subnet is different from an IP address segment of the service network of the VM. In this way, when a dialing test is performed in a same dialing test subnet or a dialing test across dialing test subnets is performed between different dialing test subnets, network bandwidth of the service network is not occupied, and further, a service of the service network is not affected. In addition, a data packet interacted between VMs in the service network is not forwarded using the dialing test network such that a dialing test is not affected and dialing test result distortion is not caused.

In a possible design, the dialing test policy further includes a dialing test attribute. The dialing test attribute includes a dialing test between same dialing test subnets and a dialing test between different dialing test subnets.

When the source dialing test port is being created, if the dialing test attribute indicates the dialing test between same dialing test subnets, different IP addresses of a same dialing test subnet are separately configured for the source dialing test port and the destination dialing test port such that a data packet is sent between the source dialing test port and the destination dialing test port using the IP addresses to implement a dialing test in a same dialing test network.

When the destination dialing test port is being created, if the dialing test attribute indicates the dialing test between different dialing test subnets, different IP addresses of different dialing test subnets are separately configured for the source dialing test port and the destination dialing test port such that a data packet is sent between the source dialing test port and the destination dialing test port using the IP addresses to implement a dialing test between different dialing test subnets.

In a possible design, the dialing test system includes a deployment management module and a dialing test control module.

In this design, that the dialing test system creates a dialing test network includes that the management module creates the dialing test network, and that the management module creates the dialing test network further includes allocating an IP address segment of the dialing test network, and recording the IP address segment of the dialing test network.

In this design, that the dialing test system obtains a dialing test policy may include determining, by the dialing test control module, the dialing test policy according to a received dialing test command. A user may use an application programming interface (API) at any time, to design a dialing test instruction and send the dialing test instruction to the dialing test control module. Therefore, generating the dialing test policy using the dialing test instruction is suitable for a scenario in which a dialing test is performed in time according to a requirement.

In this design, that the dialing test system obtains a dialing test policy may further include determining, by the dialing test control module, the dialing test policy according to a preset dialing test condition. One or more dialing test groups on which a dialing test is to be performed may be set in the dialing test condition, and a dialing test attribute may be further set. The dialing test policy is intelligently determined according to the preset dialing test condition, and a dialing test is performed on each preset dialing test group according to the dialing test policy. Therefore, intelligently generating the dialing test policy using the dialing test condition is suitable for a scenario in which a dialing test is performed at a specified time.

The dialing test control module creates the source dialing test port on the source computing node, creates the destination dialing test port on the destination computing node, and separately configures IP addresses of the dialing test network for the source dialing test port and the destination dialing test port. In comparison with the other approaches, the dialing test control module allocates the IP addresses of the dialing test network to the source dialing test port and the destination dialing test port such that a dialing test from the source dialing test port to the destination dialing test port is implemented using the IP addresses.

In a possible design, before separately creating the source dialing test port and the destination dialing test port, the dialing test control module sends an application request to the management module. The management module responds to the application request, and allocates the IP addresses of the dialing test network to the source dialing test port and the destination dialing test port. The dialing test control module obtains the IP address of the source dialing test port and the IP address of the destination dialing test port that are allocated by the management module such that the dialing test control module allocates the IP addresses when creating the source dialing test port and the destination dialing test port.

In a possible design, the management module records a correspondence between information about the source dialing test port and the source computing node, and a correspondence between information about the destination dialing test port and the destination computing node.

After the dialing test control module separately creates the source dialing test port and the destination dialing test port, the management module identifies the source dialing test port and the destination dialing test port according to the recorded correspondences, and determines that the source dialing test port and the destination dialing test port are accessed to a network. In this design, after both the source dialing test port and the destination dialing test port are accessed to a network, a data packet may be sent between the source dialing test port and the destination dialing test port to implement a dialing test.

In a possible design, the management module delivers a forwarding table of the source dialing test port to the source computing node, and delivers a forwarding table of the destination dialing test port to the destination computing node such that the source dialing test port and the destination dialing test port respectively execute dialing test tasks using the received forwarding tables. In this design, a VM forwards, according to the forwarding table of the source dialing test port and the forwarding table of the destination dialing test port, a data packet used for a dialing test in order to execute a dialing test task between the source dialing test port and the destination dialing test port.

In a possible design, the management module is improvement on a module (for example, a NEUTRON module in an OPENSTACK architecture) used for creating a virtual network in the other approaches. The management module may create a virtual network using a computing node and a physical network, including creating the dialing test network and the service network. Optionally, the management module may create different virtual networks for different tenants. The different virtual networks do not overlap each other, and the different virtual networks cannot access each other because of non-overlapping. For example, the management module may create a virtual network for a dialing test tenant as a dialing test network, and the management module may create a virtual network for a service tenant as a service network.

In a possible design, agent modules are deployed on both the source computing node and the destination computing node. The dialing test control module instructs the agent module of the source computing node and the agent module of the destination computing node to execute dialing test tasks.

In a possible design, agent modules and dialing test performing modules are deployed on both the source computing node and the destination computing node. When receiving a dialing test task sent by the dialing test control module, the agent module instructs the dialing test performing module to perform a connectivity dialing test or a network performance dialing test.

According to a second aspect, this application provides a dialing test system. The dialing test system includes a function module that performs the dialing test method provided in the first aspect or any possible design of the first aspect. Function module division is not limited, and function modules may be correspondingly divided according to procedure steps of the dialing test method, or function modules may be divided according to a specific implementation requirement, for example, function modules in a dialing test system are divided according to different function deployment of functions of the dialing test system separately on one or more computing nodes.

According to a third aspect, this application provides a computing node, and the computing node is any one of multiple computing nodes included in a VM system.

The computing node provided in this application includes at least one processor, a memory, and a communications interface. The at least one processor, the memory, and the communications interface are connected using a bus. The memory stores a computer execution instruction, and the at least one processor executes the computer execution instruction stored in the memory such that the computing node performs the dialing test method provided in the foregoing first aspect or all possible designs of the first aspect by performing data interaction with another computing node in the VM system using the communications interface, or the computing node implements the dialing test system in the second aspect by performing data interaction with another computing node in the VM system using the communications interface.

According to a fourth aspect, a computer readable storage medium is provided. The computer readable storage medium stores a computer execution instruction, and when at least one processor of a computing node executes the computer execution instruction, the computing node performs the dialing test method provided in the foregoing first aspect or all possible designs of the first aspect.

According to a fifth aspect, a computer program product is provided. The computer program product includes a computer execution instruction, the computer execution instruction is stored in a computer readable storage medium, at least one processor of a computing node may read the computer execution instruction from the computer readable storage medium, and the at least one processor executes the computer execution instruction such that the computing node implements the dialing test method provided in the foregoing first aspect or all possible designs of the first aspect.

DESCRIPTION OF EMBODIMENTS

The following describes the technical solutions provided in the embodiments of the present application with reference to the accompanying drawings in the embodiments of the present application.

Figure 1:
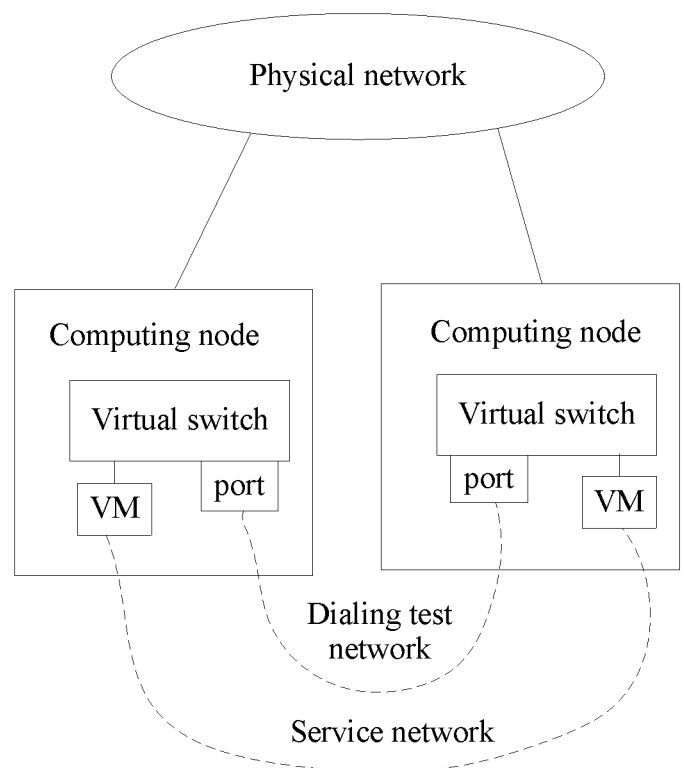
FIG. 1 is a schematic diagram of a system architecture of a VM system according to an embodiment of the present application.

Referring to FIG. 1, multiple computing nodes (two computing nodes are shown in FIG. 1) are interconnected using a physical network.

The computing node may be a server, or may be another device with a computing capability.

The physical network may be the Internet, for example, a network created using the Transmission Control Protocol (TCP)/IP.

Resource virtualization is performed on a physical resource such as the computing node and the physical network. A VM system is created using a cloud computing technology. A cloud computing platform is a management center of the VM system, and may deploy a VM, a virtual network, a virtual switch, and the like on the computing node.

In FIG. 1, an IP address of a service network is configured for a VM on each computing node. The virtual switch forwards, in the service network, a data packet transmitted between VMs. In the other approaches, a dialing test is implemented in a service network using a VM.

In FIG. 1, a dialing test port (designated as a port in FIG. 1) is deployed on each computing node, and the port is further deployed on a virtual switch. An IP address in a dialing test network is configured for each port. The dialing test network is a virtual network that does not overlap a service network. The dialing test network is used for performing a dialing test. In the embodiments of the present application, a dialing test is implemented in a dialing test network using a port.

In the following, an implementation manner for performing a dialing test in a dialing test network is described in detail.

Method Embodiment of Dialing Test Method

Figure 2:
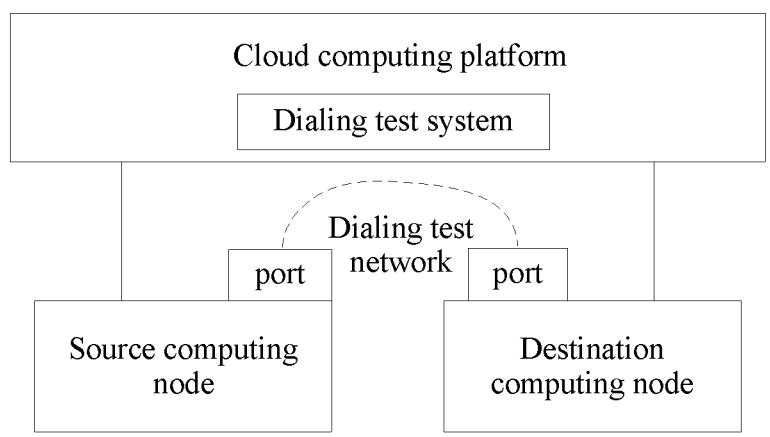
FIG. 2 is a schematic diagram of another system architecture of a VM system according to an embodiment of the present application.

FIG. 2 provides another schematic diagram of a VM system. FIG. 1 and FIG. 2 are schematic diagrams of a VM system that are provided from different perspectives. FIG. 1 facilitates distinction from dialing test implementation in the other approaches. FIG. 2 facilitates description of dialing test implementation in a dialing test network in this embodiment of the present application. A virtual switch, a VM, and a service network in FIG. 1 are not shown in FIG. 2. A dialing test system shown in FIG. 2 is deployed on a cloud computing platform, and is used to perform a dialing test method. In FIG. 2, a port on a source computing node is a source dialing test port, and a port on a destination computing node is a destination dialing test port.

Procedure steps of the dialing test method performed by the dialing test system are as follows.

Step S201: Create a dialing test network.

The dialing test system creates the dialing test network. The dialing test system may create a dialing test network specially used for a dialing test. The dialing test network does not overlap a service network of a VM. In an optional implementation manner for implementing non-overlapping, that the dialing test network does not overlap a service network of a VM in this implementation manner may further mean that an IP address segment of the dialing test network is different from an IP address segment of the service network of the VM, that is, any IP address of the dialing test network has no same IP address in the IP address segment of the service network. In the other approaches, a dialing test is performed in the service network. By contrast, in this embodiment of the present application, a dialing test is performed in the dialing test network such that network bandwidth of the service network is not occupied, and a service is not affected.

In an optional implementation manner of step S201, step S201 may include creating at least two dialing test subnets, where an IP address segment of each dialing test subnet is different from the IP address segment of the service network of the VM.

Further, the dialing test system creates the dialing test network, and creates the at least two dialing test subnets in the dialing test network. The IP address segment of each dialing test subnet is obtained by dividing the IP address segment of the dialing test network. The IP address segment of the dialing test network is different from the IP address segment of the service network such that the IP address segment of each dialing test subnet is different from the IP address segment of the service network. In this way, no network bandwidth of the service network is occupied regardless of whether a dialing test is performed in a same dialing test subnet or a dialing test across dialing test subnets is performed in different dialing test subnets, and further, a service of the service network is not affected.

Step S202: Obtain a dialing test policy.

The dialing test system obtains the dialing test policy. The dialing test policy includes a source computing node and a destination computing node on which a dialing test is to be performed. During specific implementation, an identifier used to identify the source computing node and an identifier used to identify the destination computing node are recorded in the dialing test policy. The dialing test policy may be a dialing test policy formulated by a user in the dialing test system, may be a dialing test policy generated by the dialing test system according to a preset dialing test condition, or may be an existing dialing test policy.

In an optional implementation manner, the dialing test policy further includes a dialing test attribute. The dialing test attribute includes a dialing test between same dialing test subnets and a dialing test between different dialing test subnets. Further, the dialing test between same dialing test subnets is a dialing test in a virtual layer 2 (L2) network, and the dialing test between different dialing test subnets, that is, a dialing test across dialing test subnets, is a dialing test in a virtual layer 3 (L3) network.

In a possible scenario, the dialing test network includes the virtual L2 network and/or the virtual L3 network. The virtual L2 network is a dialing test subnet of the dialing test network, and the virtual L3 network includes two dialing test subnets.

Step S203: Separately create a source dialing test port and a destination dialing test port.

The dialing test system creates the source dialing test port on the source computing node, and creates the destination dialing test port on the destination computing node. The source dialing test port is located on the source computing node, and the destination dialing test port is located on the destination computing node such that a dialing test between the source computing node and the destination computing node is implemented using the source dialing test port and the destination dialing test port.

An IP address of the source dialing test port and an IP address of the destination dialing test port are different IP addresses of the dialing test network such that a dialing test is performed by sending a data packet between the source dialing test port and the destination dialing test port using the IP addresses.

In an optional implementation manner, if the dialing test policy further includes the dialing test attribute, step S203 is divided into two specific implementation manners that include the following.

In a first specific implementation manner, when the dialing test attribute indicates the dialing test between same dialing test subnets, different IP addresses of a same dialing test subnet are separately configured for the source dialing test port and the destination dialing test port.

In a second specific implementation manner, when the dialing test attribute indicates the dialing test between different dialing test subnets, different IP addresses of different dialing test subnets are separately configured for the source dialing test port and the destination dialing test port.

In the first specific implementation manner, the different IP addresses of the same dialing test subnet are separately configured for the source dialing test port and the destination dialing test port according to the dialing test attribute such that a dialing test in the virtual L2 network is implemented by sending a data packet between the source dialing test port and the destination dialing test port using the IP addresses.

In the second specific implementation manner, the different IP addresses of the different dialing test subnets are separately configured for the source dialing test port and the destination dialing test port according to the dialing test attribute such that a dialing test in the virtual L3 network is implemented by sending a data packet between the source dialing test port and the destination dialing test port using the IP addresses.

In an optional implementation manner, in step S202, one or more dialing test groups may be designated in the dialing test policy. Each dialing test group has one source computing node and one destination computing node. If multiple dialing test groups are designated in the dialing test policy, a computing node is a source computing node in one dialing test group, and may be a destination computing node in another dialing test group or other several dialing test groups. In this way, a dialing test can be simultaneously performed among multiple computing nodes.

Optionally, a same dialing test port may be simultaneously used as a source dialing test port on a source computing node and a destination dialing test port on a destination computing node in different dialing test groups.

Further, if a computing node is a source computing node in a dialing test group, in step S203, the source dialing test port is created on the computing node. If the computing node is a destination computing node in another dialing test group, in step S203, the destination dialing test port may not be created and the source dialing test port is directly used as a destination dialing test port. In step S203, when the source dialing test port is used as the destination dialing test port, an IP address of the dialing test port is not changed. Similarly, if a destination dialing test port is first created on the computing node, subsequently, the destination dialing test port may be directly used as a source dialing test port. When the destination dialing test port is used as the source dialing test port, an IP address of the dialing test port is not changed. Different dialing test groups share a dialing test port on the computing node such that a quantity of dialing test ports can be reduced, resources occupied for maintaining a dialing test port in a dialing test system are reduced, and dialing test port management in the dialing test system is facilitated.

Optionally, a same dialing test port cannot be separately used as a source dialing test port on a source computing node and a destination dialing test port on a destination computing node in different dialing test groups. Further, if a computing node is a source computing node in a dialing test group, in step S203, the source dialing test port is created on the computing node. If the computing node is a destination computing node in another dialing test group, in step S203, the source dialing test port is not used and a new dialing test port is recreated and used as a destination dialing test port, and an IP address of the recreated destination dialing test port is different from an IP address of the source dialing test port. In this way, different dialing test ports are separately used in the dialing test groups to perform a dialing test such that dialing test management is facilitated.

Step S204: Separately deploy respective dialing test resources for the source dialing test port and the destination dialing test port.

The dialing test system obtains the dialing test resource of the source dialing test port from the source computing node by means of division, and obtains the dialing test resource of the destination dialing test port from the destination computing node by means of division.

The dialing test resource of the source dialing test port is a resource required by the source dialing test port for performing a dialing test. The dialing test resource of the source dialing test port does not overlap a resource of a VM deployed on the source computing node. Further, a resource provided by the source computing node may include a computing resource, a storage resource, a network resource, and the like. The dialing test resource of the source dialing test port and the resource of the deployed VM are different resources obtained from the resource of the source computing node by means of division. That the dialing test resource of the source dialing test port does not overlap a resource of a VM deployed on the source computing node means that a resource belonging to the source dialing test port is not a resource of the deployed VM, for example, a computing resource obtained by means of division and used as the dialing test resource of the source dialing test port is not a computing resource of the deployed VM, and a network resource obtained by means of division and used as the dialing test resource of the source dialing test port is not a network resource of the deployed VM. The dialing test resource of the source dialing test port is isolated from the resource of the VM deployed on the source computing node. Isolation means that the VM cannot use the dialing test resource of the source dialing test port, and the source dialing test port cannot use the resource of the VM to perform a dialing test.

Similarly, the dialing test resource of the destination dialing test port is a resource required by the destination dialing test port for performing a dialing test. The dialing test resource of the destination dialing test port does not overlap a resource of a VM deployed on the destination computing node.

A dialing test resource of a dialing test port does not overlap a resource used for deploying a VM. When a dialing test from the source dialing test port to the destination dialing test port is performed, only the dialing test resource is used, and the resource used for deploying a VM is not occupied in order to avoid a case in which a service is affected because the resource used for deploying a VM is occupied by the dialing test.

In an optional implementation manner, in step S204, an implementation manner for configuring the dialing test resource for the source dialing test port includes allocating a first namespace to the source dialing test port. The first namespace includes the resource required by the source dialing test port for performing a dialing test, that is, the first namespace includes the dialing test resource of the source dialing test port.

Further, in this implementation manner, the dialing test system instructs the source computing node to determine the first namespace. The source computing node divides the resource of the source computing node according to a namespace to obtain a resource that belongs to the first namespace, and obtain a resource used for deploying a VM. For example, a computing resource and a network resource of the source computing node are separately divided to obtain a computing resource and a network resource that belong to the first namespace, and obtain a computing resource and a network resource used for deploying a VM. The resource of the VM deployed on the source computing node does not belong to the first namespace but belongs to another namespace. In this implementation manner, resources are isolated using namespaces such that the dialing test resource of the source dialing test port does not overlap the resource of the deployed VM.

The first namespace is isolated from the VM deployed on the source computing node. By means of isolation, when a dialing test is performed using the source dialing test port, the resource of the VM cannot be used in order to avoid a case in which a service is affected because a resource used for deploying the VM is occupied by the dialing test. By means of isolation, the VM cannot use the resource of the first namespace either in order to avoid a case in which dialing test result distortion (for example, a dialing test result of network performance is worsened) is caused because the dialing test is affected.

Occupancy of the dialing test resource included in the first namespace is less than resource occupancy of each VM deployed on the source computing node. Further, in the other approaches, a dialing test is implemented using a VM, and an OS needs to run on the VM, and therefore, the VM occupies more resources. In this implementation manner, during implementation of a dialing test, a data packet used for a dialing test is sent from the source dialing test port directly using the dialing test resource of the source dialing test port, for example, the data packet is sent using a running process of the dialing test resource of the source dialing test port. Therefore, a resource required for running the OS of the VM is saved. In the other approaches, a dialing test is performed using a VM. By contrast, in this implementation manner, a dialing test is performed using the dialing test resource included in the first namespace, and few resources are occupied in the dialing test such that implementation of a dialing test on the source computing node is facilitated. The source computing node has limited resources, and therefore, even though remaining resources of the source computing node are not enough to deploy a VM, enough dialing test resources can be usually obtained from the remaining resources of the source computing node by means of division such that a success rate of the dialing test on the source computing node is increased.

In an optional implementation manner, in step S204, an implementation manner for configuring the dialing test resource for the destination dialing test port includes allocating a second namespace to the destination dialing test port. The second namespace includes the resource required by the destination dialing test port for performing a dialing test, that is, the second namespace includes the dialing test resource of the destination dialing test port.

In this implementation manner, the dialing test system instructs the destination computing node to determine the second namespace. The destination computing node divides the resource of the destination computing node according to a namespace to obtain a resource that belongs to the second namespace, and obtain a resource for deploying a VM. The resource used for deploying the VM on the destination computing node does not belong to the second namespace but belongs to another namespace. In this implementation manner, resources are isolated using namespaces such that the dialing test resource of the destination dialing test port does not overlap the resource of the deployed VM.

The second namespace is isolated from the VM deployed on the destination computing node. By means of isolation, when a dialing test is performed using the destination dialing test port, the resource of the VM cannot be used in order to avoid a case in which a service is affected because a resource used for deploying the VM is occupied by the dialing test. By means of isolation, the VM cannot use the resource of the second namespace either in order to avoid a case in which dialing test result distortion (for example, a dialing test result of network performance is worsened) is caused because the dialing test is affected.

Occupancy of the dialing test resource included in the second namespace is less than resource occupancy of each VM deployed on the destination computing node. In the other approaches, a dialing test is implemented using a VM. By contrast, in this implementation manner, during implementation of a dialing test, a data packet is received from the destination dialing test port directly using the dialing test resource of the destination dialing test port, for example, the data packet is received using a running process of the dialing test resource of the destination dialing test port. Therefore, a resource required for running an OS of the VM is saved. In the other approaches, a dialing test is performed using a VM. By contrast, in this implementation manner, a dialing test is performed using the dialing test resource included in the second namespace, and few resources are occupied in the dialing test such that implementation of a dialing test on the destination computing node is facilitated. The destination computing node has limited resources, and therefore, even though remaining resources of the destination computing node are not enough to deploy a VM, enough dialing test resources can be usually obtained from the remaining resources of the destination computing node by means of division such that a success rate of the dialing test on the destination computing node is increased.

Step S205: Trigger a dialing test procedure such that a dialing test task is executed between the source dialing test port and the destination dialing test port.

The dialing test system triggers the dialing test procedure, including delivering a dialing test task to the source computing node and the destination computing node. The dialing test task may be a connectivity dialing test or a network performance dialing test. The dialing test task is executed between the source dialing test port and the destination dialing test port using an IP address based on the dialing test network such that connectivity or network performance from the source computing node to the destination computing node is detected.

In the other approaches, only a VM has an IP address, and dialing test can only be implemented in a service network using the VM. In comparison with the other approaches, in the dialing test method provided in this embodiment of the present application, an IP address is configured for a dialing test port, and dialing test can be implemented in a dialing test network directly using the dialing test port in order to avoid a case in which a service is affected because a service network is occupied.

In the other approaches, a dialing test is implemented using a VM, and the VM runs a service. In comparison with the other approaches, in the dialing test method provided in this embodiment of the present application, when a dialing test from a source computing node to a destination computing node is implemented, a resource on a computing node that does not belong to a VM is directly used in order to avoid a case in which a service running on the VM is affected because a resource of the VM is occupied.

In the other approaches, a VM needs to run an OS, and a resource needs to be occupied for running the OS. In comparison with the other approaches, in the dialing test method provided in this embodiment of the present application, a data packet used for a dialing test may be sent from a source dialing test port directly using a dialing test resource of the source dialing test port (for example, the data packet is sent using a running process of the dialing test resource of the source dialing test port), and the data packet may be received from a destination dialing test port directly using a dialing test resource of the destination dialing test port (for example, the data packet is received using a running process of the dialing test resource of the destination dialing test port). An entire dialing test process from the source dialing test port to the destination dialing test port does not need participation of an OS of a VM. Therefore, a resource required for running the OS of the VM is saved. In addition, in the other approaches, a dialing test is performed using a VM. By contrast, in this embodiment of the present application, a dialing test is performed using a dialing test resource, and few resources are occupied in the dialing test such that implementation of a dialing test on a computing node is facilitated. The computing node has limited resources, and therefore, even though remaining resources of the computing node are not enough to deploy a VM, enough dialing test resources can be usually obtained from the remaining resources of the computing node by means of division such that a success rate of the dialing test on the computing node is increased.

Method Embodiment 2

Figure 3:
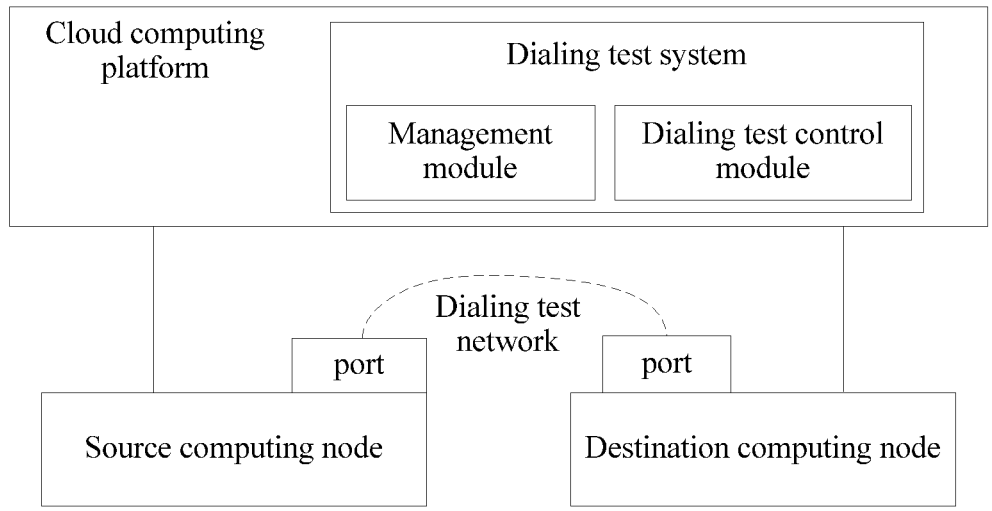
FIG. 3 is a schematic diagram of still another system architecture of a VM system according to an embodiment of the present application.

A dialing test system is deployed on a cloud computing platform of a VM system in FIG. 3. It is noted that FIG. 3 is based on FIG. 2. As shown in FIG. 3, the dialing test system includes a management module and a dialing test control module.

The management module may create a dialing test network that does not overlap a service network. A manner for implementing non-overlapping may be that the dialing test network and the service network separately belong to different IP address segments. If the management module is improvement on a module (for example, a NEUTRON module in an OPENSTACK architecture) used for creating a virtual network in the other approaches, the management module may further create the service network.

The dialing test control module is newly added and deployed in the dialing test system in this embodiment of the present application. The management module and the dialing test control module may be deployed together or separately deployed in the dialing test system. In this embodiment, for ease of description of a function of the dialing test control module, a dialing test method is described using separate deployment of the management module and the dialing test control module as an example.

Procedure steps of the dialing test method cooperatively performed by the management module and the dialing test control module are as follows.

Step S301: The management module creates a dialing test network.

That the management module creates a dialing test network includes allocating an IP address segment of the dialing test network, and recording the IP address segment of the dialing test network. The management module records the IP address segment of the dialing test network such that the dialing test control module obtains the IP address segment of the dialing test network from the management module, or the management module sends the IP address segment of the dialing test network to the dialing test control module.

The dialing test control module may instruct the management module to create the dialing test network.

An implementation principle of step S301 is similar to that of step S201. For similar implementation details for implementing step S301 and step S201, refer to corresponding description in Method Embodiment 1. Details are not described herein.

Step S302: The dialing test control module determines the dialing test policy according to a received dialing test command, or determines the dialing test policy according to a preset dialing test condition.

A source computing node, a destination computing node, and a dialing test attribute are designated in the dialing test command. The dialing test attribute may include a network type and a dialing test type. The network type may be a virtual L2 network or a virtual L3 network, and it may be determined according to the network type whether the dialing test attribute indicates a dialing test between same dialing test subnets or a dialing test between different dialing test subnets. The dialing test type may be a connectivity dialing test or a network performance dialing test. In Embodiment 2, the dialing test system or the dialing test control module may provide an API that generates a dialing test instruction, for example, an API that satisfies a software architecture style such as representational state transfer (REST). A user may use the API at any time to design the dialing test instruction. Triggering a dialing test using the dialing test instruction is suitable for a scenario in which a dialing test is performed in time according to a requirement.

One or more dialing test groups on which a dialing test is to be performed may be set in the dialing test condition, and a dialing test attribute may be further set. The dialing test policy is intelligently determined according to the preset dialing test condition, and a dialing test is performed on each preset dialing test group according to the dialing test policy. Intelligently performing a dialing test using the dialing test condition is suitable for a scenario in which a dialing test is performed at a specified time.

An implementation principle of step S302 is similar to that of step S202. For similar implementation details for implementing step S302 and step S202, refer to corresponding description in Method Embodiment 1. Details are not described herein.

Step S303: The dialing test control module creates the source dialing test port on the source computing node, creates the destination dialing test port on the destination computing node, and separately configures IP addresses of the dialing test network for the source dialing test port and the destination dialing test port.

Step S304: The dialing test control module separately deploys respective dialing test resources for the source dialing test port and the destination dialing test port.

Step S305: The dialing test control module triggers a dialing test procedure.

Implementation manners of step S303, step S304, and step S305 have a same principle as implementation manners of step S203, step S204, and step S205, and details are not described herein. The dialing test control module in the dialing test system performs step S303, step S304, and step S305.

In comparison with the other approaches, a dialing test control module is provided in Embodiment 2. The dialing test control module may deploy a dialing test, for example, create a source dialing test port and a destination dialing test port, allocate IP addresses of a dialing test network to the source dialing test port and the destination dialing test port, and deploy respective dialing test resources for the source dialing test port and the destination dialing test port. The dialing test control module may trigger a dialing test procedure such that a dialing test task is executed between the source dialing test port and the destination dialing test port. The dialing test control module may implement a dialing test between the source dialing test port and the destination dialing test port such that a network dialing test between a source computing node and a destination computing node is implemented.

Figure 4:
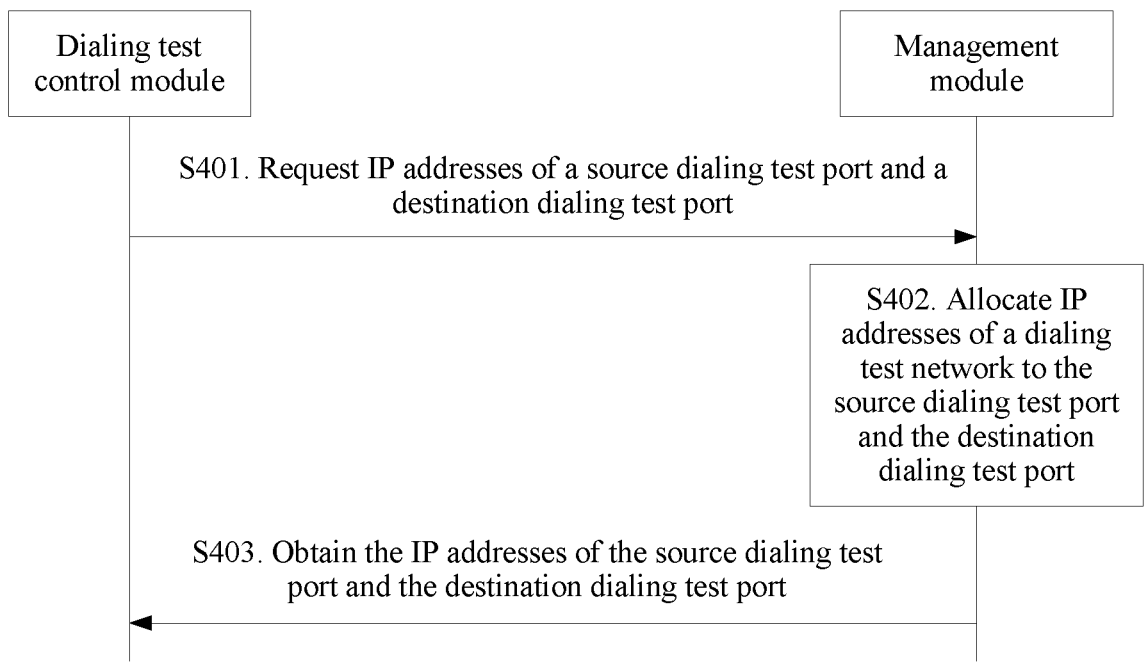
FIG. 4 is a schematic flowchart of obtaining an IP address by a dialing test control module.

In an optional implementation manner, before step S303, the dialing test method provided in Embodiment 2 may further include steps shown in FIG. 4.

Step S401: The dialing test control module sends an application request to the management module, where the application request is used for requesting the IP addresses of the source dialing test port and the destination dialing test port.

Step S402: The management module allocates the IP addresses of the dialing test network to the source dialing test port and the destination dialing test port. Further, the management module records a correspondence between information about the source dialing test port and the source computing node, and a correspondence between information about the destination dialing test port and the destination computing node.

The information about the source dialing test port is used to uniquely identify the source dialing test port. The information about the source dialing test port includes a port name of the source dialing test port, an IP address of the source dialing test port, a Media Access Control (MAC)

layer address of the source dialing test port, and another unique identifier of the source dialing test port.

Similarly, the information about the destination dialing test port is used to uniquely identify the destination dialing test port. The information about the destination dialing test port includes a port name of the destination dialing test port, an IP address of the destination dialing test port, a MAC address of the destination dialing test port, and another unique identifier of the destination dialing test port.

In a possible recording manner for recording the correspondence between information about the source dialing test port and the source computing node, any type of information about the source dialing test port (such as the port name or the IP address of the source dialing test port) is bound to a unique identifier of the source computing node, or any combination of information about the source dialing test port (such as the port name and the IP address that are of the source dialing test port) is bound to a unique identifier of the source computing node. The unique identifier of the source computing node may be an IP address or an identity (ID) of the source computing node. It should be known that a manner that is similar to this possible recording manner may be used to record the correspondence between information about the destination dialing test port and the destination computing node.

Step S403: The dialing test control module obtains the IP address of the source dialing test port and the IP address of the destination dialing test port that are allocated by the management module.

Using the steps shown in FIG. 4, the dialing test control module obtains the IP address of the source dialing test port and the IP address of the destination dialing test port from the management module such that the IP addresses are allocated in step S303 when the source dialing test port and the destination dialing test port are created.

In an implementation example of the steps shown in FIG. 4, in step S401, the dialing test control module requests the information about the source dialing test port and the information about the destination dialing test port from the management module using the application request. In step S402, if the management module learns, using the application request, that the dialing test control module is to perform step S303 to create the source dialing test port and the destination dialing test port, the management module generates the information about the source dialing test port (for example, the port name, the IP address, and the MAC address that are of the source dialing test port) and the information about the destination dialing test port (for example, the port name, the IP address, and the MAC address that are of the destination dialing test port). In step S403, the dialing test control module sends the information about the source dialing test port and the information about the destination dialing test port to the management module. Therefore, when creating the source dialing test port on the source computing node, the dialing test control module configures the information about the source dialing test port for the source dialing test port, and when creating the destination dialing test port on the destination computing node, the dialing test control module configures the information about the destination dialing test port for the destination dialing test port.

In an optional implementation manner, after step S303 and before step S305, the dialing test method in Embodiment 2 may further include the following step.

Step S306: The management module identifies the source dialing test port and the destination dialing test port according to the recorded correspondences, and determines that the source dialing test port and the destination dialing test port are accessed to a network.

Further, the dialing test control module creates the source dialing test port and the destination dialing test port in step S303. In this case, the management module does not know the source dialing test port and the destination dialing test port created in step S303. The management module performs matching and identification on the source computing node using the information about the source dialing test port based on the correspondence between information about the source dialing test port and the source computing node. If correct information about the source dialing test port is configured for the source dialing test port when the source dialing test port is created on the source computing node, the source dialing test port is matched and identified. If incorrect information about the source dialing test port is configured for the source dialing test port when the source dialing test port is created on the source computing node, the source dialing test port is not matched or identified. Similar to matching and identification of the source dialing test port, the management module can match and identify the destination dialing test port. If the source dialing test port is accessed to a network when the management module matches and identifies the source dialing test port, the source dialing test port is set to valid. If the destination dialing test port is accessed to a network when the management module matches and identifies the destination dialing test port, the destination dialing test port is set to valid. After the source dialing test port is accessed to a network, a data packet may be received or transmitted in the dialing test network using the source dialing test port. After the destination dialing test port is accessed to a network, a data packet may be received or transmitted in the dialing test network using the destination dialing test port. After both the source dialing test port and the destination dialing test port are accessed to a network, a data packet may be sent between the source dialing test port and the destination dialing test port, to implement a dialing test.

In an optional implementation manner, before step S305, the dialing test method provided in Embodiment 2 may further include the following step.

Step S307: The management module delivers a forwarding table of the source dialing test port to the source computing node, and delivers a forwarding table of the destination dialing test port to the destination computing node such that the source dialing test port and the destination dialing test port respectively execute dialing test tasks using the received forwarding tables.

The forwarding table is referred to as a flow table in some technical application scenarios (for example, in an OPEN-STACK architecture).

The management module separately deploys virtual switches on the source computing node and the destination computing node. As shown in FIG. 1, the virtual switch is configured to forward a data packet in a virtual network. Further, in this implementation manner, the virtual switch forwards, in the dialing test network according to the forwarding table of the source dialing test port and the forwarding table of the destination dialing test port, a data packet used for performing a dialing test between the source dialing test port and the destination dialing test port.

The management module delivers the forwarding table of the source dialing test port to the source computing node, for example, may deliver the forwarding table of the source dialing test port to the virtual switch on the source computing node. Similarly, the management module may deliver the forwarding table of the destination dialing test port to the destination computing node (which may be the virtual switch on the destination computing node).

The forwarding table of the source dialing test port is used to instruct the virtual switch on the source computing node to receive or transmit a data packet of the source dialing test port. Forwarding a data packet interacted between the source dialing test port and the destination dialing test port is used as an example. The virtual switch on the source computing node forwards a data packet whose destination IP address is the IP address of the source dialing test port to the source dialing test port according to the forwarding table of the source dialing test port, and forwards a data packet sent from the source dialing test port (that is, a data packet whose source IP address is the IP address of the source dialing test port) to the destination dialing test port in the dialing test network according to the IP address of the destination dialing test port.

The forwarding table of the destination dialing test port is used to instruct the virtual switch on the destination computing node to receive or transmit a data packet of the destination dialing test port. Forwarding a data packet interacted between the source dialing test port and the destination dialing test port is used as an example. The virtual switch on the destination computing node forwards a data packet whose destination IP address is the IP address of the destination dialing test port to the destination dialing test port according to the forwarding table of the destination dialing test port, and forwards a data packet sent from the destination dialing test port (that is, a data packet whose source IP address is the IP address of the destination dialing test port) to the source dialing test port in the dialing test network according to the IP address of the source dialing test port.

In this implementation manner, a VM forwards, according to a forwarding table of a source dialing test port and a forwarding table of a destination dialing test port, a data packet used for a dialing test in order to execute a dialing test task between the source dialing test port and the destination dialing test port.

In an optional implementation manner, an agent module is deployed on each computing node. The agent module may be an agent of a dialing test control module on each computing node. The dialing test control module is in a communication connection with the agent module. A protocol used for the communication connection is a remote procedure call protocol (RPC). The dialing test control module is used as a server in RPC communication, and the agent module is used as a client in RPC communication. In an optional implementation manner of the agent module, the agent module may be implemented by performing a process or a thread of a function of the agent module on a computing node.

In this implementation manner, that the dialing test control module creates the source dialing test port on the source computing node is further implemented as follows. The dialing test control module sends information about the source dialing test port to an agent module on the source computing node, the agent module applies to an OS of the source computing node for a first namespace, and requests the OS to create a port using a resource of the first namespace, the agent module configures the information about the source dialing test port for the port, for example, configures an IP address and a MAC address of the source dialing test port for the port, for another example, changes a port name of the port to a port name in the information about the source dialing test port, and the agent module configures the port as a port of a virtual switch on the source computing node after configuring the information about the source dialing test port for the port such that the port for which the information about the source dialing test port is configured becomes the source dialing test port.

Similar to an implementation manner in which the dialing test control module instructs the agent module to create the source dialing test port on the source computing node, the dialing test control module may instruct the agent module to create the destination dialing test port on the destination computing node.

In an optional implementation manner, the dialing test control module instructs an agent module of the source computing node and an agent module of the destination computing node to execute a dialing test task. The dialing test task may be a connectivity dialing test or a network performance dialing test.

Figure 5:
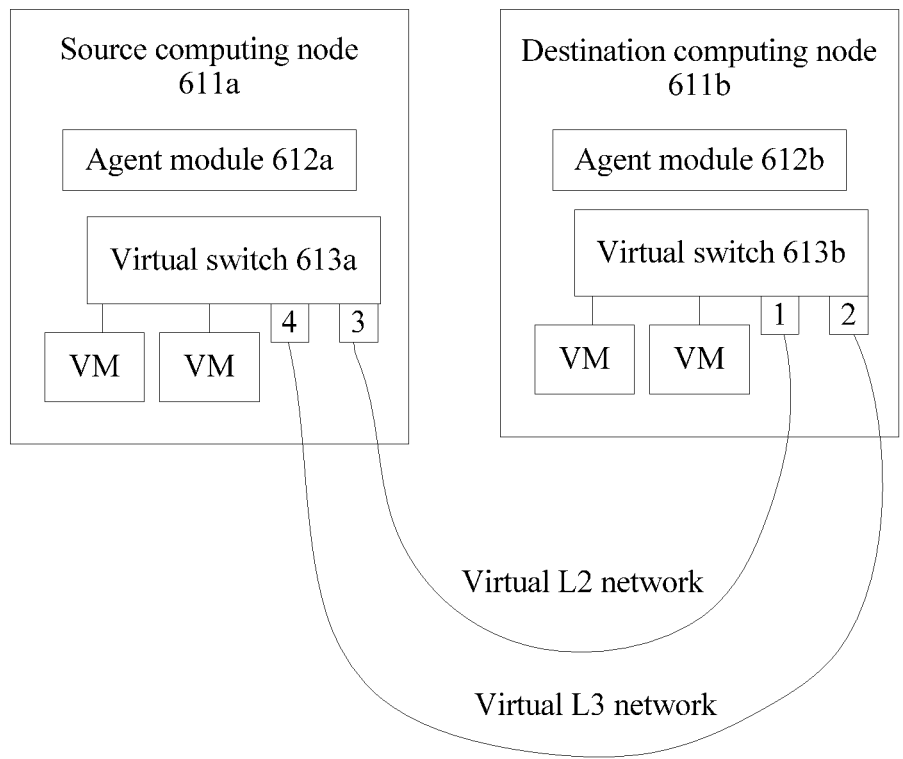
FIG. 5 is a schematic diagram of yet another system architecture of a VM system according to an embodiment of the present application.
Figure 6:
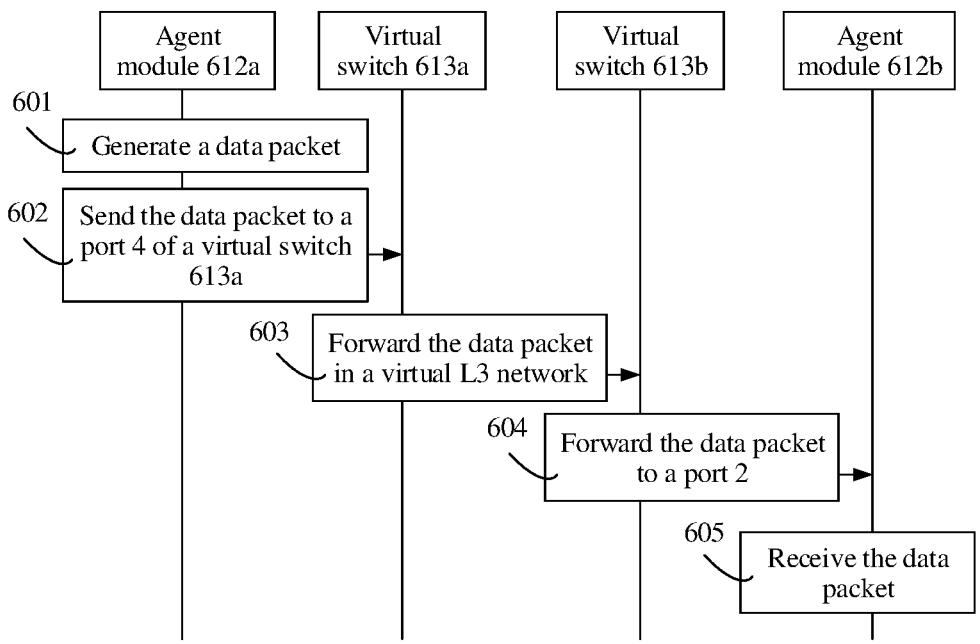
FIG. 6 is a schematic diagram of a dialing test procedure of one dialing test according to an embodiment of the present application.

In FIG. 5, a ports 1, 2, 3, and 4 are four dialing test ports. In the following, a dialing test procedure of one dialing test in a virtual L3 network is described with reference to FIG. 5 and FIG. 6 using an example.

Step 601: An agent module 612*a* generates, according to an instruction of a dialing test control module, a data packet used for a dialing test.

A source IP address of the data packet is an IP address of the port 4. A destination IP address of the data packet is an IP address of the port 2. The IP address of the port 4 and the IP address of the port 2 are separate IP addresses of different dialing test subnets in the virtual L3 network. The port 4 is a source dialing test port, and the port 2 is a destination dialing test port.

Step 602: The agent module 612*a* sends the data packet to a port 4 of a virtual switch 613*a*.

For example, the agent module 612*a* may send the data to the port 4 using a ping instruction.

Step 603: The virtual switch 613*a* forwards the data packet in a virtual L3 network based on a destination IP address of the data packet according to a forwarding table of the port 4.

Step 604: A virtual switch 613*b* receives the data packet from the virtual L3 network, determines, based on the destination IP address of the data packet and according to a forwarding table of a port 2, that the data packet is to be sent to the port 2, and forwards the data packet to the port 2.

Step 605: An agent module 612*b* receives the data packet from the port 2.

After one dialing test is performed using step 601, step 602, step 603, step 604, and step 605, one connectivity dialing test may be implemented. If no packet loss occurs in a data packet used for a connectivity dialing test from the port 4 to the port 2, the agent module 612*b* receives the data packet from the port 2, and determines that the port 2 and the port 4 are connected in the virtual L3 network. Further, the agent module 612*b* may further determine a network delay of the virtual L3 network in the current connectivity dialing test according to a time difference between receiving the data packet and transmitting the data packet. If a packet loss occurs in a data packet used for a connectivity dialing test from the port 4 to the port 2, the agent module 612*b* does not receive the data packet from the port 2, and determines that the port 2 and the port 4 are disconnected in the virtual L3 network, that is, a network connection between the port 2 and the port 4 is in a disconnected state.

To implement one network performance dialing test, multiple dialing tests need to be continuously performed from the port 4 to the port 2 in a first time period, and each dialing test is implemented in a manner similar to the foregoing dialing test. Therefore, network performance (such as network jitter and a packet loss rate) from the port 4 to the port 2 can be detected in the network performance dialing test.

Similar to one dialing test procedure performed in the virtual L3 network, the agent module 612a and the agent module 612b may further detect connectivity and a network delay of a virtual L2 network. Certainly, multiple dialing tests are continuously performed from the port 3 to the port 1 such that network performance from the port 3 to the port 1 in the virtual L2 network can be detected.

In another possible implementation for executing the dialing test task provided in this implementation manner, dialing test performing modules are deployed on both the source computing node 611a and the destination computing node 611b. When receiving a dialing test task sent by the dialing test control module, an agent module instructs the dialing test performing module to perform a connectivity dialing test or a network performance dialing test. An implementation manner in which the dialing test performing module of the source computing node generates and sends a data packet to perform a connectivity dialing test or a network performance dialing test is similar to the foregoing implementation manner in which the agent module of the source computing node directly generates and sends a data packet to perform a connectivity dialing test or a network performance dialing test, and details are not described herein again. An implementation manner in which the dialing test performing module of the destination computing node receives a data packet to perform a connectivity dialing test or a network performance dialing test is similar to the foregoing implementation manner in which the agent module of the destination computing node directly receives a data packet to perform a connectivity dialing test or a network performance dialing test, and details are not described herein again.

The dialing test performing module of the source computing node may be implemented using dialing test software that is run using a resource of a first namespace. The dialing test performing module of the destination computing node may be implemented using dialing test software that is run using a resource of a second namespace. The dialing test software may be iperf.

In this implementation manner, if an agent module executes a dialing test task, an agent module on a destination computing node sends an execution result of a dialing test task to a dialing test control module. If a dialing test performing module executes a dialing test task, an agent module on a destination computing node first obtains an execution result of the dialing test task from a dialing test performing module on the destination computing node, and then sends the execution result of the dialing test task to a dialing test control module. The dialing test control module stores the execution result of the dialing test task in order to subsequently use the execution result of the dialing test task, for example, a user views the execution result of the dialing test task in a dialing test system.

Dialing Test System Embodiment

Figure 7:
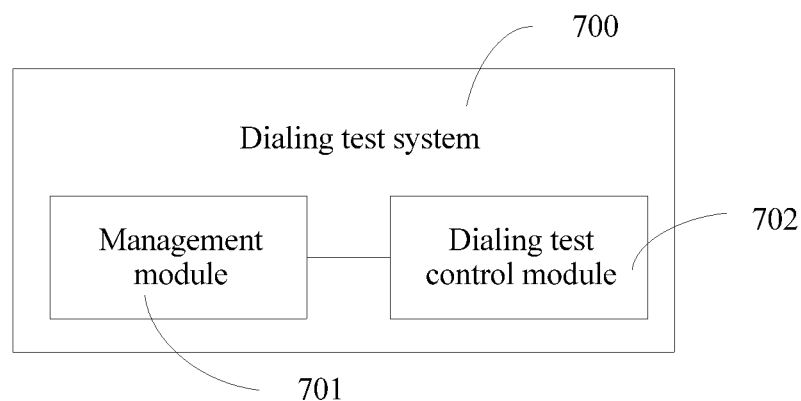
FIG. 7 is a schematic structural diagram of a dialing test system according to an embodiment of the present application.

FIG. 7 is a schematic structural diagram of a dialing test system 700.

A VM system includes at least two computing nodes, and the at least two computing nodes are configured to deploy a VM. Further, a cloud computing platform in the VM system is deployed on the at least two computing nodes, and the cloud computing platform may deploy VMs on the at least two computing nodes. The VM system is the VM system described in the foregoing method embodiment, and the cloud computing platform is the cloud computing platform described in the foregoing method embodiment.

The dialing test system 700 is deployed on the cloud computing platform in the VM system. The dialing test system 700 is a dialing test system that performs a method embodiment.

The dialing test system 700 is used to perform a dialing test on the VM system. Referring to FIG. 7, the dialing test system 700 includes a management module 701 and a dialing test control module 702.

The management module 701 is configured to create a dialing test network. The dialing test network does not overlap a service network of the VM. In an optional implementation manner, non-overlapping may mean that an IP address segment of the dialing test network is different from an IP address segment of the service network. In an optional implementation manner, the dialing test network and the service network may be allocated to different tenants, and networks of the different tenants cannot access each other, that is, the dialing test network and the service network that are not overlapped cannot access each other.

The dialing test control module 702 is configured to obtain a dialing test policy. The dialing test policy includes a source computing node and a destination computing node on which a dialing test is to be performed.

The dialing test control module 702 is configured to separately create a source dialing test port and a destination dialing test port. The source dialing test port is located on the source computing node, the destination dialing test port is located on the destination computing node, and both an IP address of the source dialing test port and an IP address of the destination dialing test port are IP addresses of the dialing test network.

The dialing test control module 702 is configured to separately deploy respective dialing test resources for the source dialing test port and the destination dialing test port. The dialing test resource of the source dialing test port does not overlap a resource of a VM deployed on the source computing node, and the dialing test resource of the destination dialing test port does not overlap a resource of a VM deployed on the destination computing node.

The dialing test control module 702 is configured to trigger a dialing test procedure such that a dialing test task is executed between the source dialing test port and the destination dialing test port.

In an optional implementation manner, the dialing test control module 702 separately configuring respective dialing test resources for the source dialing test port and the destination dialing test port includes that the dialing test control module 702 is configured to allocate a first namespace to the source dialing test port, where the first namespace includes a resource required by the source dialing test port for performing a dialing test, and is further configured to allocate a second namespace to the destination dialing test port, where the second namespace includes a resource required by the destination dialing test port for performing a dialing test.

In an optional implementation manner, the first namespace is isolated from the VM deployed on the source computing node, and the second namespace is isolated from the VM deployed on the destination computing node.

In an optional implementation manner, occupancy of a dialing test resource included in the first namespace is less than resource occupancy of each VM deployed on the source computing node, and occupancy of a dialing test resource included in the second namespace is less than resource occupancy of each VM deployed on the destination computing node.

In an optional implementation manner, the management module 701 creating a dialing test network includes that the management module 701 is configured to create at least two dialing test subnets, where an IP address segment of each dialing test subnet is different from an IP address segment of the service network of the VM.

In an optional implementation manner, the dialing test policy further includes a dialing test attribute. The dialing test attribute includes a dialing test between same dialing test subnets and a dialing test between different dialing test subnets.

The dialing test control module 702 separately creating a source dialing test port and a destination dialing test port includes that the dialing test control module 702 is configured to separately configure different IP addresses of a same dialing test subnet for the source dialing test port and the destination dialing test port when the dialing test attribute indicates the dialing test between same dialing test subnets, and separately configure different IP addresses of different dialing test subnets for the source dialing test port and the destination dialing test port when the dialing test attribute indicates the dialing test between different dialing test subnets.

In an optional implementation manner, the management module 701 creating a dialing test network includes that the management module 701 is configured to allocate an IP address segment of the dialing test network and record the IP address segment of the dialing test network.

The dialing test control module 702 obtaining a dialing test policy includes that the dialing test control module 702 is configured to determine the dialing test policy according to a received dialing test command, or determine the dialing test policy according to a preset dialing test condition.

The dialing test control module 702 separately creating a source dialing test port and a destination dialing test port includes that the dialing test control module 702 is configured to create the source dialing test port on the source computing node, create the destination dialing test port on the destination computing node, and separately configure IP addresses of the dialing test network for the source dialing test port and the destination dialing test port.

In an optional implementation manner, the dialing test control module 702 is configured to send an application request to the management module 701 before separately creating the source dialing test port and the destination dialing test port, where the application request is used for requesting IP addresses of the source dialing test port and the destination dialing test port, and is further configured to obtain the IP address of the source dialing test port and the IP address of the destination dialing test port that are allocated by the management module 701.

The management module 701 is configured to allocate the IP addresses of the dialing test network to the source dialing test port and the destination dialing test port, and record a correspondence between information about the source dialing test port and the source computing node, and a correspondence between information about the destination dialing test port and the destination computing node.

In an optional implementation manner, the management module 701 is configured to identify the source dialing test port and the destination dialing test port according to the recorded correspondences, and determine that the source dialing test port and the destination dialing test port are accessed to a network after the dialing test control module 702 separately creates the source dialing test port and the destination dialing test port.

In an optional implementation manner, the management module 701 is configured to deliver a forwarding table of the source dialing test port to the source computing node, and deliver a forwarding table of the destination dialing test port to the destination computing node such that the source dialing test port and the destination dialing test port respectively execute dialing test tasks using the received forwarding tables.

Functions of the management module 701 and the dialing test control module 702 in the dialing test system 700 are in one-to-one correspondence with steps in the dialing test method embodiment. Therefore, for function implementation of the management module 701 and the dialing test control module 702, refer to specific description in the foregoing dialing test method embodiment. Details are not described herein.

In addition, that the dialing test system 700 is divided into the management module 701 and the dialing test control module 702 is only an example of module division, and the dialing test system 700 may be divided into other function modules according to a specific implementation requirement. For example, when a cloud computing platform is deployed on multiple computing nodes to deploy functions of the dialing test system 700 on different computing nodes for implementation, the dialing test system 700 may be divided into function modules according to a computing node.

Computing Node Embodiment

A dialing test system is deployed on multiple computing nodes. Therefore, a hardware entity performing a dialing test method provided in the dialing test method embodiment is a computing node, and a hardware entity for implementing a dialing test system provided in the foregoing dialing test system embodiment is also a computing node. The computing node is shown as a computing node 800 in FIG. 8, that is, the computing node in the foregoing method embodiment is the computing node 800 shown in FIG. 8.

Figure 8:
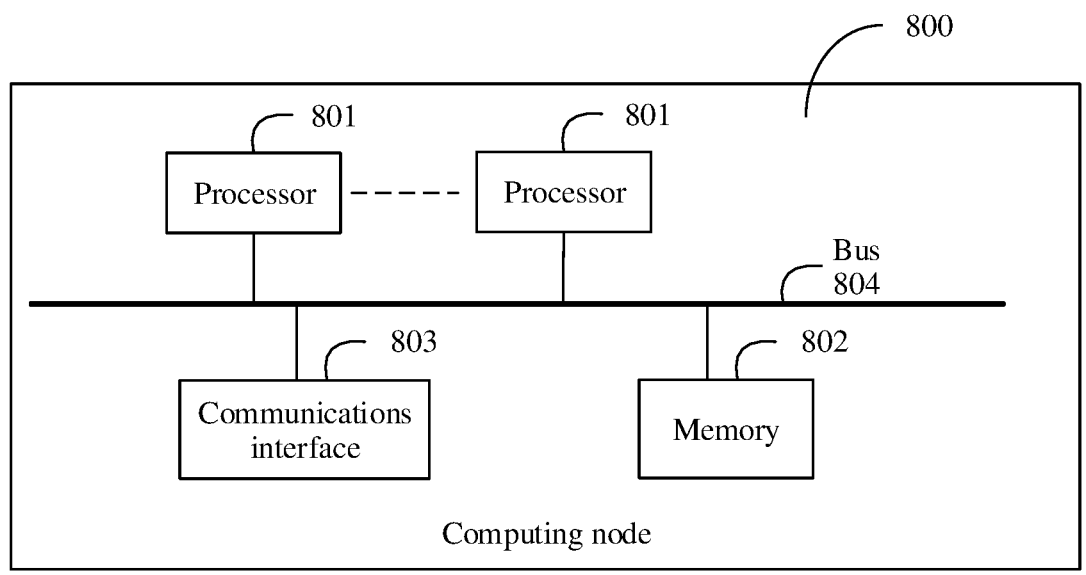
FIG. 8 is a schematic diagram of a hardware structure of a computing node according to an embodiment of the present application.

Referring to FIG. 8, the computing node 800 includes at least one processor 801, a memory 802, and a communications interface 803. The at least one processor 801, the memory 802, and the communications interface 803 are connected using a bus 804.

The memory 802 is configured to store a computer execution instruction.

The at least one processor 801 is configured to execute the computer execution instruction stored in the memory 802 such that the computing node 800 performs the dialing test method provided in the foregoing method embodiment by performing data interaction with another computing node in a VM system using the communications interface 803, or the computing node 800 implements some or all functions of the dialing test system by performing data interaction with another computing node in a VM system using the communications interface 803.

The at least one processor 801 may include different types of processors, or include processors of a same type. The at least one processor 801 may be any component with a computing processing capability, such as a central processing unit (CPU), an advanced reduced instruction set computer (RISC) Machines (ARM) processor, a field programmable gate array (FPGA), or a dedicated processor. In an optional implementation manner, the at least one processor 801 may be integrated as a many-core processor.

The memory 802 may be any one or any combination of the following storage mediums, such as a random access memory (RAM), a read-only memory (ROM), a nonvolatile memory (NVM), a solid state drive (SSD), a mechanical hard disk, a disk, and a disk array.

The communications interface 803 is used by the computing node 800 to perform data interaction with another device (for example, another computing node in the VM system). The communications interface 803 may be any one or any combination of the following components with a network access function, such as a network interface (for example, an Ethernet interface) and a wireless network interface card.

The bus 804 may include an address bus, a data bus, a control bus, and the like. For ease of denotation, the bus 804 is represented using a thick line in FIG. 8. The bus 804 may be any one or any combination of the following components used for wired data transmission, such as an industry standard architecture (ISA) bus, a peripheral component interconnect (PCI) bus, and an extended ISA (EISA) bus.

It should be understood that "first" in the foregoing "first namespace" and "second" in the foregoing "second namespace" are only used for distinction from each other. That is, the "first namespace" and the "second namespace" do not represent specific namespaces, and do not represent that there is an order relationship between them. Without departing from the protection scope of the embodiments of the present application, names of the "first namespace" and the "second namespace" may be exchanged, or the "first namespace" is changed to a "third namespace" and the "second namespace" is changed to a "fourth namespace."

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present application.

What is claimed is:

1. A dialing test method, used for performing a dialing test on a virtual machine (VM) system, wherein the VM system comprises at least two computing nodes configured to deploy a VM such that the VM is deployed on the at least two computing nodes, and wherein the method comprises:
   creating a dialing test network, wherein the dialing test network does not overlap a service network of the VM, wherein creating the dialing test network comprises creating at least two dialing test subnets, and wherein an Internet Protocol (IP) address segment of each dialing test subnet is different from an IP address segment of the service network of the VM;
   obtaining a dialing test policy, wherein the dialing test policy comprises a source computing node and a destination computing node on which the dialing test is to be performed, wherein the source computing node and the destination computing node are selected from the at least two computing nodes of the VM system;
   separately creating a source dialing test port and a destination dialing test port, wherein the source dialing test port is located on the source computing node, wherein the destination dialing test port is located on the destination computing node, and wherein both an IP address of the source dialing test port and an IP address of the destination dialing test port are IP addresses of the dialing test network;
   separately deploying respective dialing test resources for the source dialing test port and the destination dialing test port, wherein separately deploying the respective dialing test resources comprises deploying a dialing test resource of the source dialing test port that does not overlap a resource of a VM deployed on the source computing node, and deploying a dialing test resource of the destination dialing test port that does not overlap a resource of a VM deployed on the destination computing node; and
   triggering a dialing test procedure.

2. The method according to claim 1, wherein separately deploying the respective dialing test resources for the source dialing test port and the destination dialing test port comprises:
   allocating a first namespace to the source dialing test port, wherein the first namespace comprises a resource required by the source dialing test port for performing the dialing test; and
   allocating a second namespace to the destination dialing test port, wherein the second namespace comprises a resource required by the destination dialing test port for performing the dialing test.

3. The method according to claim 2, wherein the first namespace is isolated from the VM deployed on the source computing node, and wherein the second namespace is isolated from the VM deployed on the destination computing node.

4. The method according to claim 2, wherein occupancy of a dialing test resource comprised in the first namespace is less than resource occupancy of each VM deployed on the source computing node, and wherein occupancy of a dialing test resource comprised in the second namespace is less than resource occupancy of each VM deployed on the destination computing node.

5. The method according to claim 1, wherein the dialing test policy further comprises a dialing test attribute, wherein the dialing test attribute comprises a dialing test in a dialing test subnet or a dialing test between different dialing test subnets, and wherein separately creating the source dialing test port and the destination dialing test port comprises:
   separately configuring different IP addresses of the same dialing test subnet for the source dialing test port and the destination dialing test port when the dialing test attribute indicates the dialing test in the dialing test subnet; or
   separately configuring different IP addresses of the different dialing test subnets for the source dialing test port and the destination dialing test port when the dialing test attribute indicates the dialing test between the different dialing test subnets.

6. The method according to claim 1, wherein creating the dialing test network comprises:
   allocating at least one IP address segment of the dialing test network; and
   recording the at least one IP address segment of the dialing test network,
   wherein obtaining the dialing test policy comprises determining the dialing test policy according to a received dialing test command or a preset dialing test condition, and
   wherein separately creating the source dialing test port and the destination dialing test port comprises:

creating the source dialing test port on the source computing node;

creating the destination dialing test port on the destination computing node; and separately configuring the IP addresses of the dialing test network for the source dialing test port and the destination dialing test port.

7. The method according to claim 6, wherein before separately creating the source dialing test port and the destination dialing test port, the method further comprises:

sending an application request, wherein the application request is used for requesting the IP addresses of the source dialing test port and the destination dialing test port;

allocating the IP addresses of the dialing test network to the source dialing test port and the destination dialing test port;

recording a correspondence between the source dialing test port and the source computing node, and a correspondence between the destination dialing test port and the destination computing node; and obtaining the IP address of the source dialing test port and the IP address of the destination dialing test port.

8. The method according to claim 7, wherein after separately creating the source dialing test port and the destination dialing test port, the method further comprises:

identifying the source dialing test port and the destination dialing test port according to the recorded correspondences; and determining that the source dialing test port and the destination dialing test port are accessed to a network.

9. The method according to claim 8, further comprising:

delivering a forwarding table of the source dialing test port to the source computing node; and delivering a forwarding table of the destination dialing test port to the destination computing node.

10. The method according to claim 1, further comprising performing the dialing test procedure from the source dialing test port to the destination dialing test port without using resources required for running an operating system (OS) of the VM.

11. A computing node, used for performing a dialing test on a virtual machine (VM) system comprising at least two computing nodes, wherein the at least two computing nodes comprise the computing node and are configured to deploy a VM such that the VM is deployed on the computing node of the at least two computing nodes, wherein the computing node comprises:

a processor; and a memory coupled to the processor and configured to store a computer execution instruction, wherein the computer execution instruction causes the processor to be configured to:

create a dialing test network, wherein the dialing test network does not overlap a service network of the VM;

create at least two dialing test subnets, wherein an Internet Protocol (IP) address segment of each dialing test subnet is different from an IP address segment of the service network of the VM;

obtain a dialing test policy, wherein the dialing test policy comprises a source computing node and a destination computing node on which the dialing test is to be performed, wherein the source computing node and the destination computing node are selected from the at least two computing nodes of the VM system;

separately create a source dialing test port and a destination dialing test port, wherein the source dialing test port is located on the source computing node, wherein the destination dialing test port is located on the destination computing node, and wherein both an IP address of the source dialing test port and an IP address of the destination dialing test port are IP addresses of the dialing test network;

separately deploy respective dialing test resources for the source dialing test port and the destination dialing test port, wherein separately deploying the respective dialing test resources comprises deploying a dialing test resource of the source dialing test port that does not overlap a resource of a VM deployed on the source computing node, and deploying a dialing test resource of the destination dialing test port does not overlap a resource of a VM deployed on the destination computing node; and trigger a dialing test procedure.

12. The computing node according to claim 11, wherein the computer execution instruction further causes the processor to be configured to:

allocate a first namespace to the source dialing test port, wherein the first namespace comprises a resource required by the source dialing test port for performing the dialing test; and allocate a second namespace to the destination dialing test port, wherein the second namespace comprises a resource required by the destination dialing test port for performing the dialing test.

13. The computing node according to claim 12, wherein the first namespace is isolated from the VM deployed on the source computing node, and wherein the second namespace is isolated from the VM deployed on the destination computing node.

14. The computing node according to claim 12, wherein occupancy of a dialing test resource comprised in the first namespace is less than resource occupancy of each VM deployed on the source computing node, and wherein occupancy of a dialing test resource comprised in the second namespace is less than resource occupancy of each VM deployed on the destination computing node.

15. The computing node according to claim 11, wherein the dialing test policy further comprises a dialing test attribute, wherein the dialing test attribute comprises a dialing test in a dialing test subnet or a dialing test between different dialing test subnets, and wherein the computer execution instruction further causes the processor to be configured to:

separately configure different IP addresses of the same dialing test subnet for the source dialing test port and the destination dialing test port when the dialing test attribute indicates the dialing test in the dialing test subnet; and separately configure different IP addresses of the different dialing test subnets for the source dialing test port and the destination dialing test port when the dialing test attribute indicates the dialing test between the different dialing test subnets.

16. The computing node according to claim 11, wherein the computer execution instruction further causes the processor to be configured to:

allocate at least one IP address segment of the dialing test network;

record the at least one IP address segment of the dialing test network;

determine the dialing test policy according to a received dialing test command or a preset dialing test condition;

create the source dialing test port on the source computing node;

create the destination dialing test port on the destination computing node; and separately configure the IP addresses of the dialing test network for the source dialing test port and the destination dialing test port.

17. The computing node according to claim 16, wherein the computer execution instruction further causes the processor to be configured to:

allocate the IP addresses of the dialing test network to the source dialing test port and the destination dialing test port; and record a correspondence between the source dialing test port and the source computing node, and a correspondence between the destination dialing test port and the destination computing node.

18. The computing node according to claim 17, wherein after separately creating the source dialing test port and the destination dialing test port, the computer execution instruction further causes the processor to be configured to:

identify the source dialing test port and the destination dialing test port according to the recorded correspondences; and determine that the source dialing test port and the destination dialing test port are accessed to a network.

19. The computing node according to claim 18, wherein the computer execution instruction further causes the processor to be configured to:

deliver a forwarding table of the source dialing test port to the source computing node; and deliver a forwarding table of the destination dialing test port to the destination computing node.

20. The computing node according to claim 11, wherein the computer execution instruction further causes the processor to be configured to perform the dialing test procedure in the dialing test network such that network bandwidth of the service network is not occupied.

* * * * *

UNITED STATES PATENT AND TRADEMARK OFFICE
CERTIFICATE OF CORRECTION

| | | |
|---|---|---|
| PATENT NO. | : 10,594,586 B2 | Page 1 of 1 |
| APPLICATION NO. | : 15/799297 | |
| DATED | : March 17, 2020 | |
| INVENTOR(S) | : Zhengxian Zhang, Yingjun Tian and Yu Zhang | |

It is certified that error appears in the above-identified patent and that said Letters Patent is hereby corrected as shown below:

On the Title Page

(63) Related U.S. Application Data: "PCT/CT2016/096703" should read "PCT/CN2016/096703"

Signed and Sealed this
Sixteenth Day of June, 2020

Andrei Iancu
*Director of the United States Patent and Trademark Office*